(12) United States Patent
Berkman et al.

(10) Patent No.: US 7,596,079 B2
(45) Date of Patent: Sep. 29, 2009

(54) SYSTEM AND METHOD FOR COMMUNICATING IN A MULTI-UNIT STRUCTURE

(75) Inventors: William H. Berkman, New York, NY (US); Markus Bittner, Fahrwangen (CH); Denis Bittner, Aristau (CH)

(73) Assignee: Current Technologies, LLC, Germantown, MD (US)

( * ) Notice: Subject to any disclaimer, the term of this patent is extended or adjusted under 35 U.S.C. 154(b) by 415 days.

(21) Appl. No.: 11/693,980

(22) Filed: Mar. 30, 2007

(65) Prior Publication Data
US 2007/0280246 A1    Dec. 6, 2007

Related U.S. Application Data

(63) Continuation-in-part of application No. 11/421,278, filed on May 31, 2006.

(51) Int. Cl.
*H04J 1/12*    (2006.01)
(52) U.S. Cl. .................. 370/201; 370/236; 370/351; 370/352; 370/401; 375/257
(58) Field of Classification Search .............. 370/201, 370/236, 351, 352, 401; 375/257
See application file for complete search history.

(56) References Cited

U.S. PATENT DOCUMENTS

| | | | |
|---|---|---|---|
| 3,369,078 A | | 2/1968 | Stradley |
| 3,736,379 A | * | 5/1973 | Kagan ..................... 379/93.05 |
| 3,810,096 A | | 5/1974 | Kabat et al. |
| 3,964,048 A | | 6/1976 | Lusk et al. |
| 4,057,793 A | | 11/1977 | Johnson et al. |
| 4,060,735 A | | 11/1977 | Pascucci et al. |
| 4,239,940 A | | 12/1980 | Dorfman |

(Continued)

OTHER PUBLICATIONS

Horiguchi, Akira "High Speed Power Line Communication Technology", *Mitsubishi Electric Advance* vol. 109, (Mar. 2005),1-27.

(Continued)

*Primary Examiner*—Ayaz R Sheikh
*Assistant Examiner*—Mounir Moutaouakil
(74) *Attorney, Agent, or Firm*—Mel Barnes; Capital Legal Group, LLC (57) ABSTRACT

A system and method of providing communications over twisted pair conductors connected to a plurality of communication devices located in a plurality of units of a multi-unit structure is provided. In one embodiment, the system comprises an upstream device having a first modem and a first non-conductive coupler communicatively coupled to the first modem and configured to couple data signals to and from the plurality of twisted pair conductors. The system also includes a plurality of communication devices disposed in a plurality of the units, with each having a second modem having first port and a second port, a second non-conductive coupler communicatively coupled to the first port of the second modem and configured to couple data signals to and from a twisted pair conductor. The second port of the second modem is configured to be coupled to one or more of the plurality of user devices. The upstream device is configured to communicate with the plurality of communications devices via the twisted pair conductors. In some embodiments, the non-conductive couplers comprise a magnetically permeable toroid configured to extend around substantially the entire circumference of the twisted pair conductor(s), and a winding wound around the toroid.

33 Claims, 5 Drawing Sheets

U.S. PATENT DOCUMENTS

| | | |
|---|---|---|
| 5,066,939 A | 11/1991 | Mansfield, Jr. |
| 5,257,006 A | 10/1993 | Graham et al. |
| 5,319,634 A | 6/1994 | Bartholomew et al. |
| 5,929,748 A | 7/1999 | Odinak |
| 6,151,480 A | 11/2000 | Fischer et al. |
| 6,160,795 A | 12/2000 | Hosemann |
| 6,373,377 B1 | 4/2002 | Sacca et al. |
| 6,417,762 B1 | 7/2002 | Comer |
| 6,526,581 B1 | 2/2003 | Edson |
| 6,587,739 B1 | 7/2003 | Abrams et al. |
| 6,614,093 B2 * | 9/2003 | Ott et al. ............ 257/531 |
| 6,771,775 B1 | 8/2004 | Widmer |
| 6,778,817 B1 | 8/2004 | Bullock et al. |
| 6,842,459 B1 | 1/2005 | Binder |
| 6,950,567 B2 * | 9/2005 | Kline ............ 385/15 |
| 6,952,159 B1 | 10/2005 | Muller |
| 6,956,464 B2 | 10/2005 | Wang et al. |
| 6,961,303 B1 | 11/2005 | Binder |
| 6,975,212 B2 | 12/2005 | Crenshaw et al. |
| 7,269,403 B1 | 9/2007 | Miao |
| 2002/0011923 A1 | 1/2002 | Cunningham et al. |
| 2002/0021716 A1 | 2/2002 | Terk |
| 2002/0186699 A1 | 12/2002 | Kwok |
| 2003/0050737 A1 | 3/2003 | Osann, Jr. |
| 2003/0052770 A1 | 3/2003 | Mansfield, Jr. et al. |
| 2003/0062990 A1 | 4/2003 | Schaeffer, Jr. et al. |
| 2003/0071719 A1 | 4/2003 | Crenshaw et al. |
| 2003/0100288 A1 | 5/2003 | Tomlinson, Jr. et al. |
| 2003/0103307 A1 | 6/2003 | Dostert |
| 2003/0106067 A1 | 6/2003 | Hoskins et al. |
| 2004/0066283 A1 | 4/2004 | Manis et al. |
| 2004/0178888 A1 | 9/2004 | Hales et al. |
| 2004/0196144 A1 | 10/2004 | Crenshaw et al. |
| 2004/0227623 A1 | 11/2004 | Pozsgay |
| 2004/0233928 A1 | 11/2004 | Pozsgay |
| 2005/0046550 A1 | 3/2005 | Crenshaw et al. |
| 2005/0128057 A1 | 6/2005 | Mansfield et al. |
| 2005/0164666 A1 | 7/2005 | Lang et al. |
| 2005/0249245 A1 | 11/2005 | Hazani et al. |
| 2006/0017324 A1 | 1/2006 | Pace et al. |
| 2006/0034330 A1 | 2/2006 | Iwamura |
| 2006/0038660 A1 | 2/2006 | Doumuki et al. |
| 2006/0049693 A1 | 3/2006 | Abraham et al. |
| 2006/0072695 A1 | 4/2006 | Iwamura |
| 2006/0073805 A1 | 4/2006 | Zumkeller et al. |
| 2006/0132299 A1 | 6/2006 | Mansfield et al. |
| 2006/0140260 A1 | 6/2006 | Wasaki et al. |
| 2006/0165054 A1 | 7/2006 | Iwamura |
| 2006/0187023 A1 | 8/2006 | Iwamura |
| 2006/0251179 A1 | 11/2006 | Ghoshal |
| 2007/0025244 A1 | 2/2007 | Ayyagari et al. |
| 2007/0036171 A1 | 2/2007 | Magin |
| 2007/0039035 A1 | 2/2007 | Magin |
| 2007/0136766 A1 | 6/2007 | Iwamura |
| 2007/0183447 A1 | 8/2007 | Binder |
| 2007/0189182 A1 | 8/2007 | Berkman et al. |
| 2007/0220570 A1 | 9/2007 | Dawson et al. |
| 2007/0280442 A1 | 12/2007 | Zhang |
| 2008/0057866 A1 | 3/2008 | Schwager et al. |

OTHER PUBLICATIONS

Hawkins, Bob "Sault Ste. Marie, Canada's First Working BPL Installation", La Revuw des Radioamateurs Canadiens,(Jul. & Aug. 2004),1-4.

"Centralized Commercial Building Applications with the Lonworks® PLT-21 Power Line Transceiver", *Lonworks Engineering Bulletin*, Echelon, (Apr. 1997),1-22.

"Demand Side Management with Lonworks® Power Line Transceivers", *Lonworks Engineering Bulletin*, (Dec. 1996),1-36.

"Written Opinion", Written Opinion Dated Aug. 12, 2008 Application No. PCT/USo7/69872, (Aug. 12, 2008).

"International Search Report", International Search Report Dated Aug. 12, 2008 Application No. PCT/US07/69872, (Aug. 12, 2008).

\* cited by examiner

SYSTEM AND METHOD FOR COMMUNICATING IN A MULTI-UNIT STRUCTURE

CROSS REFERENCE TO RELATED APPLICATIONS

This application is a continuation-in-part of, and claims priority to, U.S. patent application Ser. No. 11/421,278 filed May 31, 2006, which is incorporated herein by reference in its entirety.

FIELD OF THE INVENTION

The present invention generally relates to methods and apparatus for communicating high data-rate data services and other data packet communication modalities, and more particularly to a system and method of data packet communication in a multi-unit structure.

BACKGROUND OF THE INVENTION

Users are increasingly relying on communications networks for entertainment, shopping, education, work and other areas of commerce. Users access entertainment appliances, such as televisions, to receive cable signals for viewing television shows and movies on demand. Users access the internet to exchange e-mail communications and access audio, video, multimedia and textual data. Delivering these various data services requires a communications infrastructure.

Delivering such services to multi-dwelling buildings and other multi-unit structures often requires individual communications media extending to each individual dwelling or unit. Utility services, such as telephone, power and cable TV often may provide wiring of a type that extends into each unit. For example, unshielded twisted pair wires may be used to deliver telephone services and digital subscriber line (DSL) internet communications. Coaxial cables may be used to provide television programming and broadband communications. Power lines may be used to deliver electrical power and broadband over power line (BPL) data services.

As the demand for high data-rate services of all kind increases, there is a need for efficient and effective ways of delivering these data services to users. The present invention addresses this need.

SUMMARY OF THE INVENTION

The present invention provides a system, device and method for providing communications over a plurality of conductors connected to a plurality of communication devices located in a plurality of units of a multi-unit structure. In one embodiment, the system comprises an upstream device having a first modem and a first non-conductive coupler communicatively coupled to the first modem and configured to couple data signals to and from the plurality of twisted pair conductors. The system also includes a plurality of communication devices disposed in a plurality of the units, with each having a second modem having first port and a second port, a second non-conductive coupler communicatively coupled to the first port of the second modem and configured to couple data signals to and from a twisted pair conductor. The second port of the second modem is configured to be coupled to one or more of the plurality of user devices. The upstream device is configured to communicate with the plurality of communications devices via the twisted pair conductors. In some embodiments, the non-conductive couplers comprise a magnetically permeable toroid configured to extend around substantially the entire circumference of the twisted pair conductor(s), and a winding wound around the toroid.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

Communication System Overview

Figure 1:
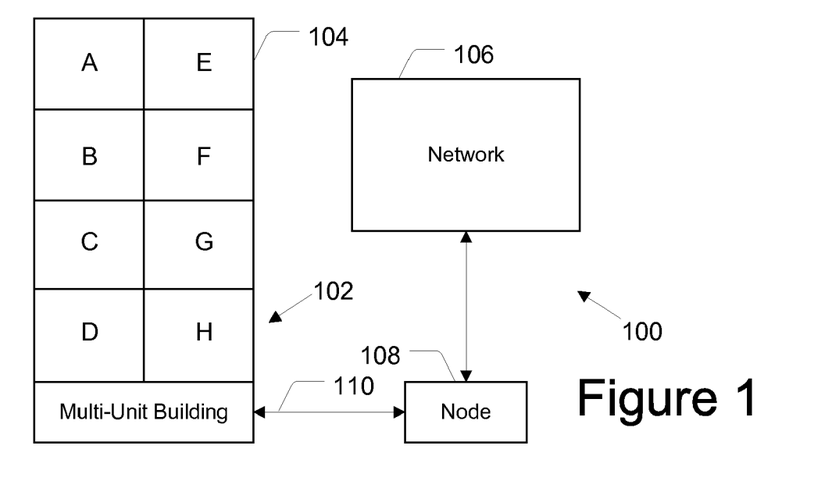
FIG. 1 is a block diagram of a communication network extending to a multi-unit structure.

FIG. 1 shows a communications network 100 that may provide high speed internet access, telephone communications, broadband communications, streaming video and audio services, and other communication services to each room, office, apartment or other unit 104 or sub-unit of a building or other multi-unit structure 102. The network 100 may provide these communication services to various structures, such as residences, apartments/condominium buildings, mixed use buildings, office buildings, industrial buildings, retail complexes, subway trains, airports, restaurants, elevators, etc.

The multi-unit structure 102 may be coupled to one or more networks 106 through one or more communications nodes 108 located at or away from the structure 102. A network 106 may be an internet protocol network (e.g., the Internet), a public switched telephone network, a power line communications network, a WiFi network, or another communications or data delivery communication network. The multi-unit structure 102 may be communicatively coupled to the node 108 over a communications medium 110. In various embodiments the communications medium 110 may comprise twisted pair conductors, coaxial cable, a T-1 line, a fiber optic cable, a wireless link, a medium voltage power line, a low voltage power line, another suitable communications medium, or any combination of the same.

Figure 2:
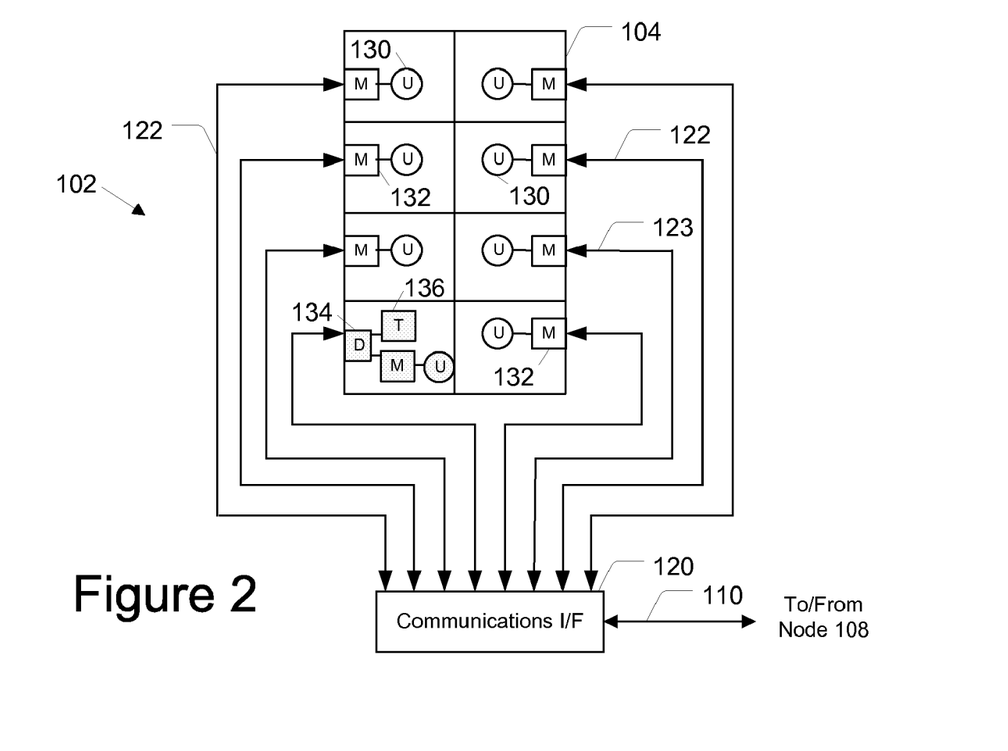
FIG. 2 is a diagram of an example embodiment of a network topology for a multi-unit structure according to an example embodiment of the present invention.

FIG. 2 shows the multi-unit structure 102 having a communications interface 120 which may maintain communication links with the communication node 108 over the communications medium 110. The multi-unit structure 102 may include multiple structural units 104 of which eight are shown in FIG. 2. Of these structural units 104 some or all of units 104 may be coupled to the communications interface 120. Those units 104 that are coupled to the communications interface 120 may be coupled via the respective sets of twisted pair conductors 122 (which typically are unshielded) that extend to the units 104. In other embodiments, units 104 may be coupled to the communications interface 120 (or to separate communications interface 120) using a different type of communications medium 123, (e.g., low voltage power lines, coaxial cables, shielded conductors). Some embodiments may be coupled via a single conductor of a twisted pair conductor set.

As discussed, the communications media 122 of this embodiment includes unshielded conductors, such as the unshielded twisted pair conductors of the type used to deliver public switched telephone signals and DSL signals. Such twisted pair conductors may extend to a switching station (not shown) from which communications are directed. Accordingly, in large multi-unit structures there may be many sets of twisted pair conductors that are grouped together in one or more bundles. A problem with unshielded twisted pair wires and other unshielded cabling is that high frequency data signals communicated on one conductor may cross couple to another conductor even though the conductors in the bundle are not conductively connected. Such cross coupling may degrade communications performance. This can be of particular concern when delivering services using protocols lacking distinct destination addresses. For example, the DSL (digital subscriber line) protocol does not use addressing (there is no media access control layer), so any DSL modem connected to the downstream end of a twisted pair may receive and process (e.g., display) cross-coupled data. However, according to an embodiment of this invention, this problem instead is made into an advantage. As described below in a separate section, the communications interface 120 may insert an address and transmit the packet downstream to the units 104 over the entire bundle. Communication devices 132 at the receiving units 104 in turn receive the packets and determine, based on the address, whether to discard the data packet or provide the data packet (or data) to a local user device 130.

User devices 130 may communicate with the network 106 through the communication interface 120. Exemplary user devices 130 include a computer, LAN, a WLAN, router, Voice-over IP endpoint, game system, digital cable box, power meter, gas meter, water meter, security system, alarm system (e.g., fire, smoke, carbon dioxide, security/burglar, etc.), a mobile telephone, stereo system, television, fax machine, HomePlug power line communication residential network, or other device having a data interface. A user device 130 may include or be coupled to a communication device 132, such as a modem to communicate with the communications interface 120. Exemplary modems may include a substantially compatible Homeplug (1.0, A/V or Turbo) modem, an Ethernet transceiver, or other modem that includes a media access control (MAC) layer or other means for providing packet based address information to a data packet. Such modems may make the determination to process the packet (provide to a user device) or to discard the packet based on any address information (e.g., destination address and/or source address, and IP and/or MAC address) or other suitable information, which may be in the data packet. Further, in some embodiments a diplexer 134 may be included at the user end to allow one set of frequencies to pass to a telephone 136 or fax machine and another set of frequencies to pass to the user's modem 132.

Communication Protocols:

Communication within the multi-unit structure 102 also may occur using a variety of protocols and media. In one example, time division multiplexing is used while implementing one or more layers of the 7 layer open systems interconnection (OSI) model. For example, at the layer 3 'network' level, the communication devices (e.g., communication interface 120, nodes 108) may implement routing technologies (including switching, routing and/or bridging), and create logical paths, known as virtual circuits, for transmitting data from device to device, (e.g., interface 120 to modem 132). Similarly, error handling, congestion control and packet sequencing can be performed at Layer 3. In one example embodiment, Layer 2 'data link' activities include encoding and decoding data packets and handling errors of the 'physical' layer 1, along with flow control and frame synchronization. The configuration of the various communication devices may vary. In some embodiments, the communications may be time division multiple access or frequency division multiple access. Some embodiments may employ Carrier Sense Multiple Access with Collision Detection (CSMA/CD) (e.g., IEEE 802.3).

Figure 3:
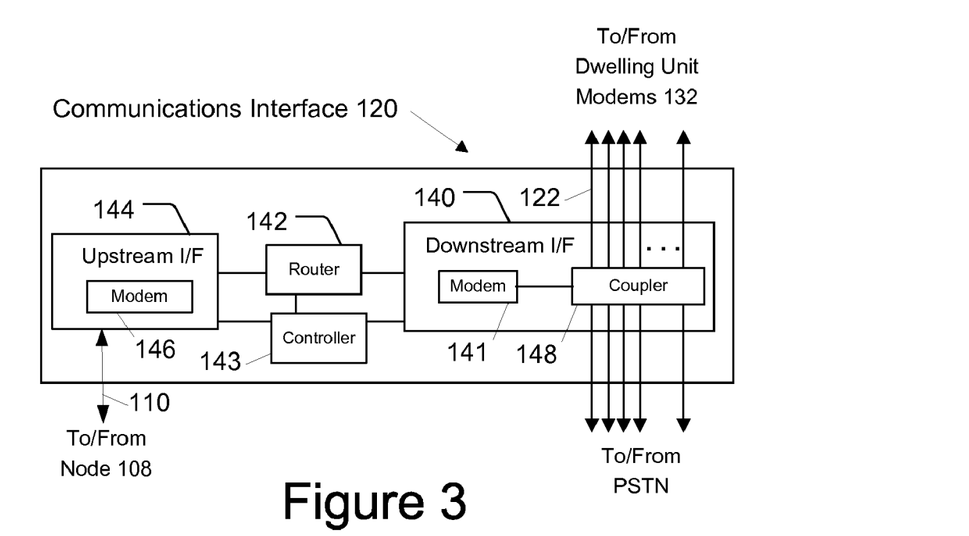
FIG. 3 is a block diagram of an example embodiment of a communication interface.

Communication Interface 120:

FIG. 3 shows a communications interface 120 according to one embodiment of the present invention. The interface 120 may include a downstream interface 140, a router 142, a controller 143 and an upstream interface 144. The router 140 and controller 143 are shown as separate functional components, but may be formed of the same physical elements (e.g., a processor and memory). In other words, the controller 143 may be programmed to provide routing functions. Downstream communications, which may originate outside the multi-unit structure 102, are received at the upstream interface 144, and may be routed (including routing, bridging or switching) by the router 142 to the downstream interface 140. Such downstream communications may be decoupled from the communications medium 110 and received at a modem 146 of the upstream interface 144, which demodulates the communication. The router 142 may process the communication and apply a destination address corresponding to one or more of the communication devices (e.g., modems 132) in the units 104. Thus, the router 142 (herein is meant to include any routing device such as, for example, a bridge, switch, router, other such functional component) may include a routing table to determine which address (e.g., a destination MAC address of the modem) to insert in a data packet based on the destination IP address (e.g., corresponding to the computer or other user device) of the data packet. The router 142 may also determine that the data packet is addressed for the communications interface 120 itself and provide the data to the controller 143. If provided to the modem 141, the modem 141 may encode, encrypt, and modulate the communication, and may transmit the communication toward the structural units 104. A coupler 148 may couple the transmitted communication onto the communication media 122. The transmitted communication then may be received at the respective modems 132 of the respective units 104.

Upstream communications typically originate at a user device 130. A communication device 132 having a modem may connect the user device 130 to one or more conductors of the communication media 110. The communication device 132 may transmit the upstream communication to the communication interface 120 along the communications medium 110. Upstream communications may be decoupled from the communications medium 122 by the coupler 148, demodulated, decoded, and decrypted by the modem 141, and routed by the router 142 to the upstream interface 144. Specifically, the router 142 may process the communication and apply a destination address corresponding to an upstream device. Thus, the router 142 or controller 143 (acting as a router) may include a routing table to determine which address (e.g., a destination MAC address of the modem) to insert in a data packet based on a portion of the destination IP address (e.g., corresponding to the computer or other user device) or source address of the data packet. The modem 146 encodes, encrypts, and modulates the communication, and may transmit the communication toward the communication node 108. A coupler (not shown) of the upstream interface 144 may couple the transmitted communication onto the communication media 110. The transmitted upstream communication then may be received at the communication node 108 and transmitted onto the network 106 to an appropriate destination. In various embodiments, the upstream interface 144 and/or downstream interface 140 may also include signal conditioning circuit (e.g., amplifiers and bandpass filters) between the modem 141/146 and the coupler 148 or communications media 110. The routing table described herein, in addition to commands and other control messages, may be received via the upstream interface and stored in memory.

In some embodiments the communications interface 120 may provide communication services for user devices 130 such as security management; IP network protocol (IP) packet routing; data filtering; access control; service level monitoring; service level management; signal processing; and modulation/demodulation of signals transmitted over the communication medium. Such services may be managed by the controller 143.

Figure 4:
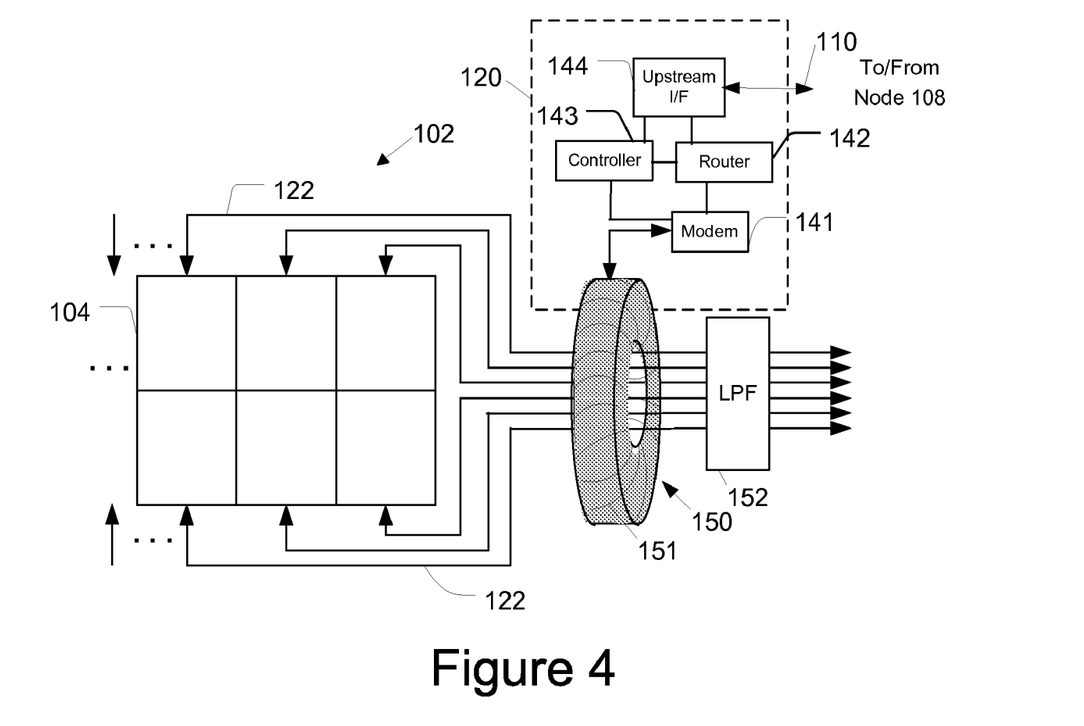
FIG. 4 is a diagram of a multi-unit structure serviced by an example embodiment of a communication interface.

FIG. 4 shows an example embodiment of a communication interface 120 in which the coupler 148 is embodied as an inductive coupler 150 to provide common mode coupling of data signals to and from twisted pair conductors 122. In such embodiment, components performing the same or similar functions as the corresponding components of the interface 120 of FIG. 3 are given the same part numbers as their corresponding components. The inductive coupler 150 of interface 120 takes advantage of the cross coupling effect of the twisted pair conductors 122. In one embodiment the inductive coupler may be formed by a magnetically permeable toroid that surrounds the bundle of twisted pair conductors 122 that extend to the structural units 104. The toroid may be hinged to allow for easy installation and removal. A winding 151 around the toroid is connected to the modem 141 (e.g., via amplifiers and bandpass filters). Communications from the modem 141 of the downstream interface 140 traverse the winding 151 wound around the toroid 150. The toroid 150 inductively couples downstream data signals from the modem 141 onto the multiple sets of twisted pair conductors 122. As a result, the downstream communication is transmitted along each one of multiple sets of twisted pair conductors. In some embodiments, the bundle may comprise more than one type of conductor. For example, the bundle may include one or more twisted pair conductors and one or more low voltage power lines and/or other conductor type.

Communications from the modems of the communication devices 132 in the units 140 will traverse the twisted pair conductors 122 to the coupler 150, where the data signals are inductively coupled to the winding 151 of the coupler 150 and received by the modem 141. As a result, the downstream communication is transmitted along each one of multiple sets of twisted pair conductors. The data signals communicated by the interface 120 may be in a different frequency band than voice band information (e.g., fax, voice communications) carried by the twisted pair conductors (which may be carried simultaneously). The data signals communicated by the interface 120 also may be in a different frequency band than digital subscriber line (DSL) data carried by the twisted pair conductors (which may be carried simultaneously). In some embodiments a low pass filter 152 (to attenuate the data signals) also may be included to avoid or minimize egression of the data signals form the multi-unit structure along a twisted pair conductor network, such as the public switched telephone network, while allowing the voice band and/or DSL signals to pass.

Figure 5:
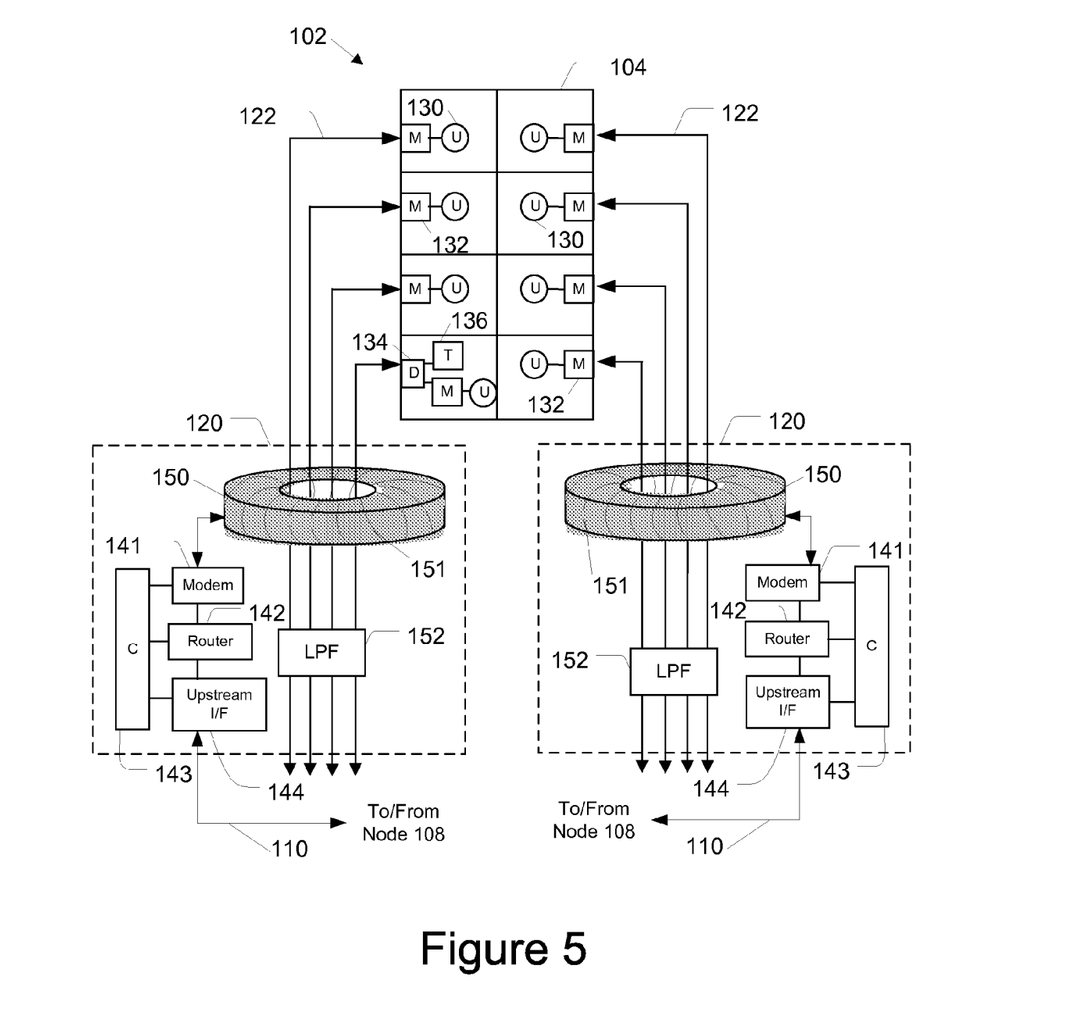
FIG. 5 is a diagram of a multi-unit structure serviced by multiple communication interfaces.

FIG. 5 shows an example multi-unit structure 102 topology in which multiple communication interfaces 120 are implemented to deliver communications to the structural units 104. Multiple communication interfaces 120 may be desirable, for example, in structures having excessive communication traffic, when the bundles are sufficiently large to preclude reliable coupling to all the conductors, and/or for other reasons. In such cases, coupling all the downstream communications onto every set of twisted pair conductors 122 may exceed a maximum bandwidth (e.g., the maximum data rate of the interface 120). By separating the sets of twisted pair conductors 122 into two or more bundles, and connecting each bundle to a separate interface 120, greater communication traffic can be provided within the structure 102. Alternately, each bundle may be allocated a separate coupler 148/150, both of which may form part of the same downstream interface 140 of the same interface 120, to allow for better coupling. Thus, one method of providing communications may include providing a first communications interface to provide communications to the structure via a bundle, determining that the data traffic through the communications interface has reached a predetermined capacity, separating the bundle into two or more bundles, and providing communications over the two or more bundles via two or more communications interfaces.

In an alternative embodiment the bundled communication media 122 coupled to the communication interface 120 may be multiple LV power lines (which may or may not be conductively connected). In such embodiment the coupler 150 couples the signals to and from the LV power lines which extend to respective units 104. Within a given structural unit the modems 132 may be embodied by power line modems, such as of the type that plug into a power outlet. In such an embodiment a user device 130 may connect to the power line modem to communicate via the network 100.

In another alternative embodiment the bundled communication media 122 coupled to the communication interface 120 may be multiple shielded coaxial cables. The coaxial cables extend to the respective structural units 104. In such embodiment the coupler 150 may couple the signals to and from the outer shielding of the coaxial cables. Within a given structural unit, the modem 132 may be embodied by a cable modem or any suitable modem with a MAC layer. In such an embodiment a user device 130 may connect to the cable modem or other modem to access the network 100. Also, in some instances, only one coaxial cable may extend to multiple units with the cable being split (via a T connector) for each floor and/or unit. In some instances the coupler may be used to couple data signals to and from the coaxial cable (e.g., the shield).

The downstream communications may be received by the modems of the communication devices 132 within each of multiple structural units 104. The modems then process the received data packets (demodulate, decode, and decrypt), and determine whether the destination address (e.g., MAC address or IP address) of the packet matches or corresponds to the address of any local destination device—for example, depending on the architecture of the system, the MAC address of local modem of the communication device 132 or the IP address of a user device 130. If the destination address within the received data packet communication does not correspond to a local destination address, then the communication is discarded. When the destination address within the received data packet communication does correspond to a local destination address, the communication is processed (e.g., provided to the destination device).

In one embodiment, the router 142 may inspect the IP source address or IP destination address and set priority tags of the upstream data packets (data packets transmitted from communication devices 132) accordingly. For example, if the source address of the upstream data packet corresponds to a Voice-over-IP (VoIP) endpoint, the router may set the IEEE 802.1 p priority to 6 and sets a DiffServ priority to EF. In a second embodiment, the DiffServ tag may already be set (e.g., by the end user device) and the router may inspect both the source and destination addresses. Accordingly, in some instances the communication interface 120 may receive multiple communications from multiple communication devices 132, and prioritize processing and further transmission of one communication over another according to predefined criteria. In addition, in some embodiment it may be desirable to perform channel encoding/decoding, source encoding/decoding, error checking, and/or error correction at each device (e.g., 120 and 132).

Figure 6:
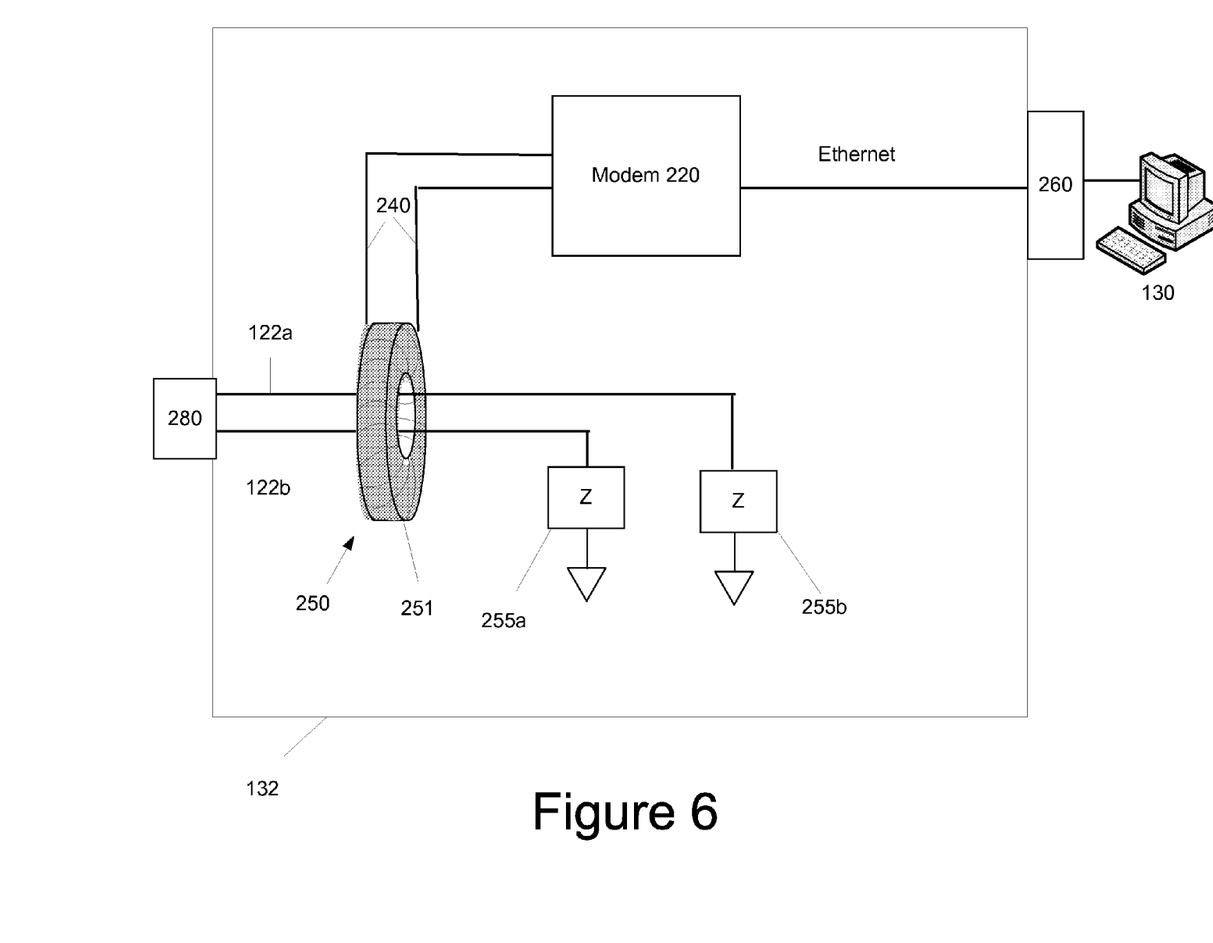
FIG. 6 is a block diagram of an example embodiment of a communications device.

FIG. 6 illustrates an example embodiment of a communication device 132 for providing communications between a user device 130 and the communications interface 120. As illustrated, this example embodiment includes a common mode coupling mechanism 250 that is substantially similar to the coupler 150 described above. In other words, data signals are coupled to and from the twisted pair conductor set 122 and the winding 240 via inductance. The twisted pair conductors 122a and 122b traverse through the aperture of the coupler 250 and are each connected to ground via an impedance 255a and 255b. Impedances 255 may be high impedance impedances for low frequencies (e.g., voice and DSL frequencies) and lower impedance for the high frequencies of the data signals to be communicated (e.g., a capacitor or high pass filter). The two ends 240 of the winding 251 of the coupler 250 are connected to the first port of the modem 220. While both ends 240 of the winding 251 are shown to be connected to the modem 220, in practice, one end of the winding, and one input to the modem 220 may both be connected to neutral (ground). As discussed, the modem 220 includes a media access layer MAC layer for layer two addressing. The modem 220 may also, or alternately, support layer 3 addressing. In one example embodiment, the modem 220 may comprises a HomePlug 1.0, A/V, or Turbo modem. While not shown, the winding 251 may be coupled to the modem 220 via one or more band pass filters and amplifiers to provide signal conditioning. The second port of the modem 220 is connected to a user device 130 via user device interface that includes port 260. The device 132 also may include an RJ-11 connector 280 for connecting to a standard telephone wall socket for connecting to the twisted pair conductors 122 of the structure. The components of communication device 132 may be housed in one or more housings and, also may be integrated into a wall unit behind a telephone/data face plate.

Figure 7:
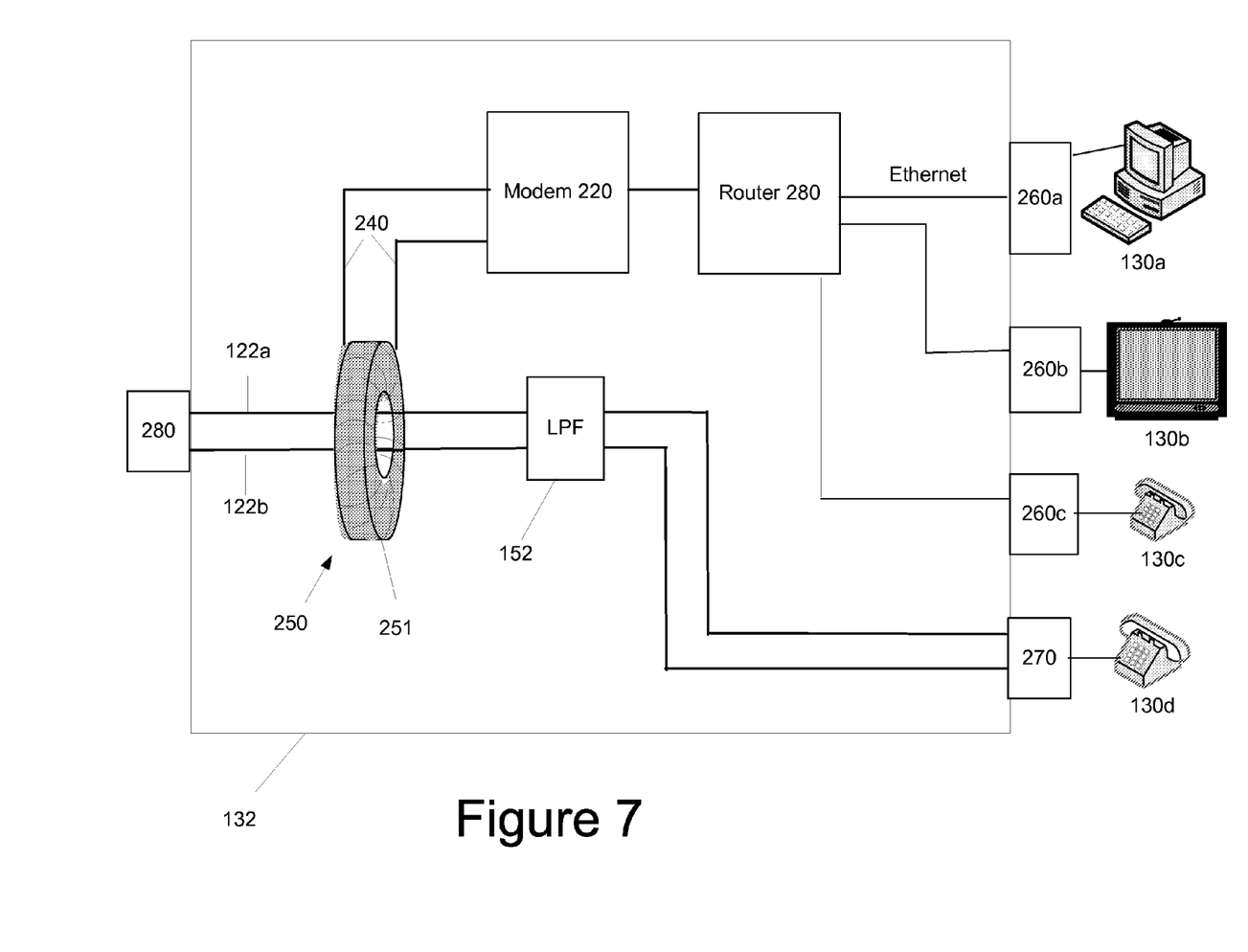
FIG. 7 is a block diagram of another example embodiment of a communications device.

FIG. 7 illustrates another example embodiment of a communication device 132 for providing communications between one or more user devices 130 and the communications interface 120. This example embodiment of the communication device 132 includes multiple ports 260a-c for connecting to a plurality of user devices 130a-c. In this embodiment, the modem 220 may be connected to a routing device 281 (a router, switch, or bridge) that is connected to two, three, four, or more ports 260 and provide routing (including routing, switching, or bridging) of data to and from one or more user devices 130. The routing device 281 may include a routing table (e.g., stored in memory) that includes an address for each of the plurality of user devices 130 to which the device 132 is connected. Routing device 281 also may be configured to prioritize transmission of upstream data based, for example, on the type data (e.g., give VoIP data a higher priority than computer data) or the type of device (e.g., give a VoIP telephone a higher priority than a computer). In addition, the twisted pair conductor set 122 may traverse through the common mode coupler 250, through a low pass filter 152 (as described above) and be connected to another port 270 (e.g., having an RJ-11 socket) that may be connected to an analog user device such as a conventional PSTN telephone or a DSL transceiver. This port 270 may likewise be present on the embodiment of FIG. 6 as well. Thus, in these example embodiments, ports 260a-c comprise digital ports and port 270 comprises an analog port. The device 132 also may include an RJ-11 connector 280 for connecting to a standard telephone socket for connecting to the twisted pair conductors 122 of the structure. The components of communication device 132 may be housed in one or more housings.

As shown in FIG. 7, port 260a may be connected to a computer 130a, port 260b may be connected to a television 130b for the reception of IP TV, and a port 260c may be connected to telephone 130c for VoIP communications. Each of these devices may have an integrated, or separate, processing device to convert the received IP data to the appropriate format and protocol for use by the device 130. For example, the telephone 130c connected to port 260c may include an analog telephone adapter (ATA) or an ATA may be connected to the port 260c or integrated into the device 132. As discussed, port 270 may be connected a telephone (as shown) for normal PSTN communications or may be connected to a DSL transceiver to provide DSL communications. Thus, the user devices 130 of some embodiments (e.g., of FIGS. 6 and 7) may be coupled to a communication device 132 that couples data to and from a twisted pair conductor set via a common mode non-conductive coupler (an inductive coupler in these embodiments). In other embodiments, only one conductor of the twisted pair conductor set (e.g., 122a) traverses through the coupler 250 and is used to communicate data with the user devices 130. In some embodiments, the routing device 281 may be external to the communication device 132.

In an alternate embodiment, a capacitive coupler or a hybrid capacitive-inductive coupler may be employed to allow coupling. Like the inductive coupler described above, some embodiments of such couplers may allow communication of the data signals to and from the conductors without making electrical (conductive) contact and are examples of non-conductive couplers. In yet another embodiment, the downstream interface 140 may be conductively connected to one (or both) conductors of each set of the twisted pair conductors. In yet another embodiment, the downstream interface 140 may be conductively connected to one (or both) conductors of some subset of the entire bundle (in which case the signals may cross couple to and from the conductors to which the device 120 is not conductively coupled). Finally, while addressing is used to transmit data to a select device in the above embodiment, other embodiments may use other means. For example, in an alternate embodiment the device 120 may transmit the data packets with different encryption keys so that only the one or more communication devices that are the correct destination devices can decrypt and process the data packet. In one embodiment, a different encryption key may be used to communicate with each device 120. In some embodiments, instead of a common mode coupler 150, the modem 141 may be conductively coupled to some of the conductors 122 to differentially transmit data on one or more pairs of conductors 122, wherein the one or more pairs may be some subset of the total set conductors 122 available. Data signals may then cross-couple from the pairs of conductors to which the modem 141 is conductively connected to be present, and be communicated over, the entire bundle of conductors 122 or some other subset of the conductors 122 (that may be greater in number than the conductors 122 to which the modem 122 is conductively connected). In other words, the modem 141 may be connected to some of the conductors 12 (e.g., for differential transmission instead of common mode) and the data signals may cross couple to additional (e.g., the remaining) conductors 122 for reception by the desired communication device 132 and user device. While the examples provided herein are in the context of in-structure communications, the present invention could also be used to communicate data over external conductors that extend to a customer premise such as external twisted pair conductor(s), coaxial cable, power line or other conductors. In addition, an addressing layer (e.g., MAC layer) could be used at an outdoor network interface device (NID) for VDSL (Very High Speed Digital Subscriber Line) communications over twisted pair conductors to overcome cross talk between conductors that may cause interference.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of providing communications over a plurality of sets of twisted pair conductors connected to a plurality of communication devices located in a plurality of units of a multi-unit structure, the method comprising:

coupling a data signal comprising a first data packet to the plurality of sets of twisted pair conductors via a first non-conductive coupler, wherein the first data packet includes a destination address;

wherein the plurality of sets of twisted pair conductors form a bundle and wherein said non-conductive coupler comprises a magnetically permeable toroid configured to extend around substantially the entire circumference of the bundle and a winding wound around said toroid;

coupling the first data packet from a twisted pair conductor at each of the plurality of communication devices via a respective non-conductive coupler; and demodulating the data to provide the first data packet at the plurality of communication devices.

2. The method of claim 1, further comprising discarding the first data at multiple communication devices among the plurality of communication devices.

3. The method of claim 1, further comprising prior to said coupling a data signal comprising a first data packet to the plurality of sets of twisted pair conductors:

receiving first data;

determining a destination address for the first data; and providing the destination address in the first data packet.

4. The method of claim 1, further comprising:

receiving a second data packet comprising second data from a first communication device of the plurality of communication devices;

receiving a third data packet comprising third data from a second communication device of the plurality of communication devices; and prioritizing upstream transmission of the third data over the second data.

5. The method of claim 4, wherein said prioritizing is based, at least in part, on information in the second data packet.

6. The method of claim 4, further comprising:

determining a destination address for the second data; and providing the destination address in a data packet with the second data.

7. The method of claim 1, wherein at least some of the plurality of sets of twisted pair conductors are configured to conduct voice band information to a public switch telephone network (PSTN) and the data signal is in a frequency band that is different from the voice band information.

8. The method of claim 1, wherein at least some of the plurality of sets of twisted pair conductors are configured to conduct digital subscriber line (DSL) data and the data signal is in a frequency band that is different from the DSL data.

9. The method of claim 1, wherein said coupling the first data packet comprises inductively coupling.

10. The method of claim 1, wherein said coupling the first data packet comprises capacitively coupling.

11. The method of claim 1, further comprising attenuating the data signal to inhibit egression of the data signal from the multi-unit structure.

12. The method of claim 1, further comprising routing the first data packet to a user device at one of said plurality of communication devices.

13. The method of claim 1, wherein each respective non-conductive coupler comprises:

a magnetically permeable toroid configured to extend around substantially the entire circumference a twisted pair conductor; and a winding wound around said toroid.

14. A system for providing communications over a plurality of twisted pair conductors connected to a plurality of user devices located in a plurality of units of a multi-unit structure, the system comprising:
- an upstream device comprising:
  - a first modem; and
  - a first non-conductive coupler communicatively coupled to said first modem and configured to couple data signals to and from the plurality of twisted pair conductors;
  - wherein the plurality of twisted pair conductors form a bundle and wherein said first non-conductive coupler comprises a magnetically permeable toroid configured to extend around substantially the entire circumference of the bundle and a winding wound around said toroid;
- a plurality of communication devices disposed in a plurality of the units, each comprising:
  - a second modem having a first port and a second port;
  - a second non-conductive coupler communicatively coupled to said first port of said second modem and configured to couple data signals to and from a twisted pair conductor; and
  - wherein said second port of said second modem is configured to be coupled to one of the plurality of user devices; and
- wherein said upstream device is configured to communicate with said plurality of communications devices via the twisted pair conductors.

15. The system of claim 14, wherein each said second non-conductive coupler comprises:
- a magnetically permeable toroid configured to extend around substantially the entire circumference of the twisted pair conductor;
- a winding wound around said toroid; and
- wherein said winding is communicatively coupled to said first port of said second modem.

16. The system of claim 14, wherein at least some of said plurality of communication devices include a routing device communicatively coupled to said second modem.

17. The system of claim 14, wherein said upstream device includes a routing device communicatively coupled to first modem.

18. The system of claim 14, wherein said first modem and said second modems are configured to communicate via an addressing protocol.

19. The system of claim 14, wherein said first modem and said second modems include a media access control layer.

20. The system of claim 14, wherein said first modem and said second modems communicate via a substantially compatible HomePlug protocol.

21. The system of claim 14, wherein at least some of the twisted pair conductors are configured to conduct voice band information to a public switch telephone network and communications between the upstream device and the communications devices are in a frequency band that is different from the voice band information.

22. The system of claim 14, wherein the first and second non-conductive couplers couple via inductance.

23. The system of claim 14, wherein said first modem and said second modems are configured to communicate via orthogonal frequency division multiplexed signals.

24. The system of claim 14, wherein each of said second non-conductive couplers comprises a common mode coupler.

25. A device for communicating over a twisted pair conductor, comprising:
- a coupler comprising a winding and a magnetically permeable core, said winding wound around said core and said core configured to be disposed substantially around the entire circumference of the twisted pair conductor, and wherein said coupler is configured to couple data signals to and from the twisted pair conductor;
- a modem communicatively coupled to said winding of said coupler, said modem including a media access control layer; and
- a user device interface communicatively coupled to said modem and configured to be communicatively coupled to one or more user devices.

26. The device of claim 25, wherein said user device interface is configured to be coupled to a plurality user devices, the device further comprising
- a routing device in communication with said modem and said user device interface.

27. The device of claim 26, wherein said routing device includes a routing table that includes an address for each of the plurality of user devices to which the user device interface is coupled.

28. The device of claim 26, wherein said routing device is configured to prioritize transmission of upstream data from the plurality of user devices.

29. The device of claim 25, further comprising a telephone port configured to connect the twisted pair conductor to a PSTN compatible telephone.

30. The device of claim 25, further comprising a port configured to connect the twisted pair conductor to a DSL transceiver.

31. The device of claim 25, wherein said user device interface includes a plurality of digital ports and at least one analog port.

32. The device of claim 25, wherein said user device interface includes an analog port communicatively to the twisted pair conductor via a low pass filter.

33. The device of claim 25, wherein the twisted pair conductor forms part of a two conductor twisted pair conductor set around which said toroid of said coupler is configured to be disposed.

* * * * *